United States Patent [19]

Kamimoto

[11] 4,425,535

[45] Jan. 10, 1984

[54] ERRONEOUS START PREVENTING DEVICE FOR BATTERY-POWERED VEHICLE

[75] Inventor: Shohei Kamimoto, Musashimurayama, Japan

[73] Assignee: Nissan Motor Company, Limited, Kanagawa, Japan

[21] Appl. No.: 228,923

[22] Filed: Jan. 27, 1981

[30] Foreign Application Priority Data

Jan. 30, 1980 [JP] Japan ..................................... 55-9599

[51] Int. Cl.³ .............................................. H02P 1/00
[52] U.S. Cl. .................................... 318/139; 318/256; 318/264; 318/280; 180/271
[58] Field of Search ............... 318/139, 264, 256, 280, 318/102, 103; 180/271, 272, 60, 65 R, 273, 287, 286; 192/0.02 R; 361/59, 114; 307/127, 132 E, 132 M, 142, 141.8, 9, 10 R

[56] References Cited

U.S. PATENT DOCUMENTS

| 1,137,519 | 4/1915 | Newburger | 180/287 X |
| 1,924,851 | 8/1933 | Gumpper | 180/287 X |
| 2,803,236 | 8/1959 | Tamburello | 180/65 R X |
| 4,033,311 | 7/1977 | Barson | 180/271 X |
| 4,143,813 | 3/1979 | Bryans | 307/142 X |

FOREIGN PATENT DOCUMENTS 2094423  9/1982  United Kingdom ................ 180/286

Primary Examiner—Ulysses Weldon
Attorney, Agent, or Firm—Lowe, King, Price & Becker

[57] ABSTRACT

A solid-state device of simple construction for preventing an erroneous start of a battery-powered vehicle, whereby an acceleration and deceleration controller is not actuated if a DC power supply is connected to a reversible motor by turning on a power supply key switch and a vehicle forward or rearward moving direction switch in an incorrect sequence, so that the vehicle can move neither forward nor rearward.

According to the present invention, there is provided a solid-state erroneous start preventing device comprising a power supply key switch, an operating switch for directing the vehicle to move forward or rearward, a first switching circuit including a reverse blocking triode thyristor and a trigger circuit therefor, the first switching circuit being turned on when the power supply key switch is turned on with the operating switch turned off, turned off when the former switch is turned on with the latter switch turned on, and also being turned on when the latter switch is turned off after the former switch is turned on with the latter switch turned on. A second switching circuit is provided, which is turned on when the operating switch is turned on for connecting a DC power supply to a reversible motor so that the acceleration and deceleration controller actuates the reversible motor to rotate when the first switching circuit turns on.

7 Claims, 3 Drawing Figures

ERRONEOUS START PREVENTING DEVICE FOR BATTERY-POWERED VEHICLE

BACKGROUND OF THE INVENTION

1. Field of the Invention

The present invention relates to a device of simple construction for preventing an erroneous start of a battery-powered vehicle.

2. Description of the Prior Art

A conventional erroneous start preventing device for a battery-powered vehicle, e.g., a fork lift truck, comprise a power supply, e.g., a battery, a key switch for turning the battery power supply on or off, a pair of switches: one (a forward motion switch) for directing the vehicle to move forward and the other (a rearward motion switch) for directing the vehicle to move rearward (the pair of switches not being simultaneously on), a pair of relays: a forward motion relay whose electromagnetic coil is energized and whose contacts are closed when the forward motion switch is turned on, and a rearward motion relay whose contacts are closed when the rearward motion switch is turned on, a neutral switch connected to the power key switch and interlocked with the forward and rearward motion switches to be deactivated (open) if either of the two switches is closed and activated only when both of the two switches are open, and a self-holding type relay whose coil is energized by the battery via the key switch when the neutral switch is activated and whose one pair of contacts A, connected to an erroneous operation indicating lamp, are in contact with each other to illuminate the lamp when the coil is not energized and another pair of contacts B, connected to a drive indicating lamp, are in contact with each other when the coil is energized.

In the above construction, when the key switch is turned on with the forward motion and rearward motion switches deactivated, the self-holding relay is actuated to bring the latter pair of contacts B described above in contact with each other since the neutral switch is closed. In this situation, the drive indicating lamp is lighted. Thereafter, when the forward motion or rearward motion switch is turned on for operating the vehicle to move the vehicle forward or rearward, the corresponding relay connects the motor to a DC power supply. At this time, the drive indicating lamp remains lighted by action of the self-holding relay although the neutral switch turned off because either of the forward motion and rearward motion switches is turned on.

When the key switch is turned on with either of the forward motion and rearward motion switches being turned on, the neutral switch is turned off so that, with the coil thereof being deenergized the self-holding relay is actuated to bring the pair of contacts A in contact with each other to light the erroneous operating jamp so that the erroneous starting of the batery-powered vehicle can be prevented.

However, such a conventional erroneous motion preventing device uses a neutral switch requiring a large volume of construction and a self-holding relay also requiring a large volume of construction, so that it is difficult to house the device within a limited space. Accordingly, the total cost of the device becomes high.

SUMMARY OF THE INVENTION

In view of the above-described problem, it is an object of the present invention to provide a small-sized and inexpensive solid-state device for preventing an erroneous start for a battery-powered vehicle without the neutral switch and related self-holding electromagnetic relay.

According to the present invention, there is provided an erroneous start preventing device comprising a power supply key switch, an operating switch for directing the vehicle driver to move the vehicle forward or rearward, a first switching circuit which is turned on to connect the power supply to a load, e.g., a speed controller of the battery powered vehicle when the power supply key switch is turned on with the operating switch turned off, but which is not turned on when the power supply key switch is turned on with the operating switch turned on, and further which remains on regardless of the switched state of the operating switch after the power supply key switch has been closed with the operating switch open, and which turns off only when the power supply key switch is turned off, and a second switching circuit which is turned on when the operating switch is closed to connect the motor to the power supply with the first switching circuit turned on.

BRIEF DESCRIPTION OF THE DRAWINGS

The features and advantage of the solid-state erroneous motions preventing device according to the present invention will be appreciated from the following description taken in conjunction with the accompanying drawings in which like reference numerals designate corresponding elements, and in which.

DESCRIPTION OF THE PREFERRED EMBODIMENTS

Reference will be made to the drawings and firstly to FIG. 1 which shows a conventional erroneous start preventing device for a battery-powered vehicle, e.g., a fork lift truck.

Figure 1:
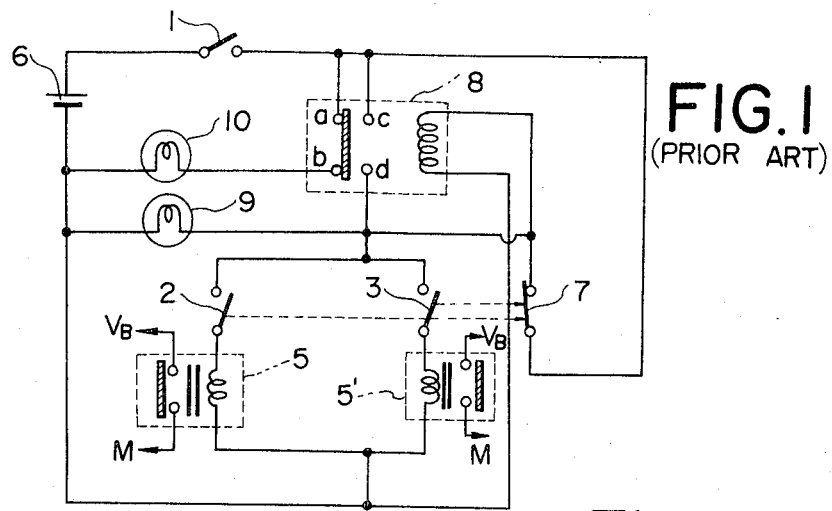
FIG. 1 is a circuit diagram showing a conventional erroneous start preventing device.

In FIG. 1, numeral 1 denotes a key switch, numeral 2 a forward motion switch, numeral 3 a rearward motion switch, numeral 5 a relay turned on when the forward motion switch 2 is turned on, numeral 5' a relay turned on when the rearward motion switch 3 is turned on, numeral 7 a neutral switch, numeral 8 a self-holding relay, numeral 9 a drive indicating lamp, and numeral 10 an erroneous operation indicating lamp. $V_B$ denotes a power supply such as a battery and M denotes a motor.

In this configuration, with both of the switches 2 and 3 are turned off (both switches 2 and 3 are not turned on simultaneously), and the key switch 1 connected to a power supply is turned on, a pair of contacts c and d of the relay 8 are interconnected since the neutral switch 7 is closed and the relay coil is energized. In this state, the drive indicating lamp 9 is illuminated and the motor M is connected to a DC power supply $V_B$ with the relay 5 or relay 5' turned on if either switch 2 or 3 is thereafter closed for forward or rearward vehicle motion. At such time, although the neutral switch 7 is open the drive indicating lamp 9 remains on.

On the other hand, if either switch 2 or 3 is closed, the relay 8 holds the pair of contacts a and b in the on state but holds the pair of contacts c and d in the off state when the key switch 1 is closed.

Therefore, the erroneous motion of the battery-powered vehicle is prevented and the erroneous operation indicating lamp 10 for indicating an erroneous sequence of turning on each switch is illuminated.

However, such a conventional device uses a neutral switch 7 interlocked with the switches 2 and 3, such a structure having a large volume. The relay 8 is energized through the action of the neutral switch 7, so that it is difficult to house the device within a limited space and the total cost is increased.

Figure 2:
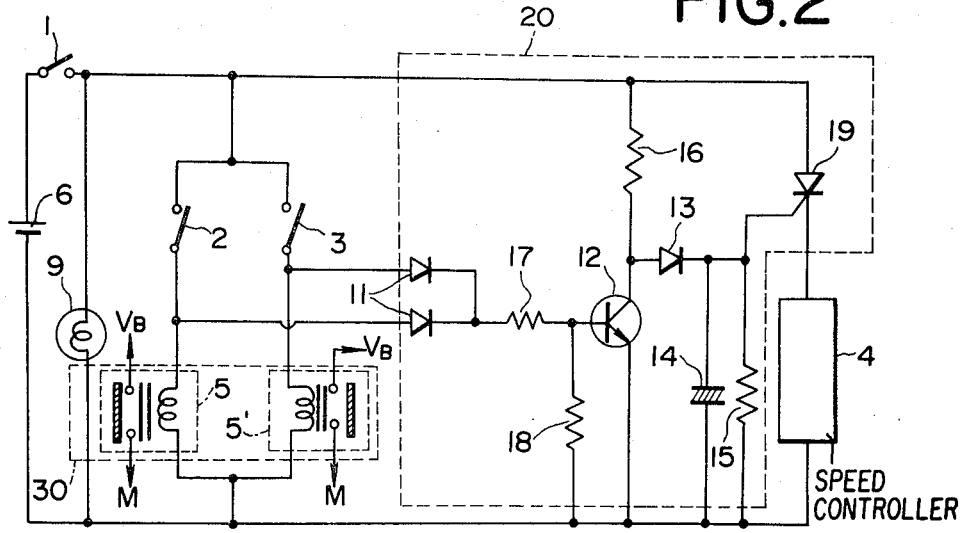
FIG. 2 is a circuit diagram showing a first preferred embodiment of erroneous start preventing device for a battery-powered vehicle according to the present invention.
Figure 3:
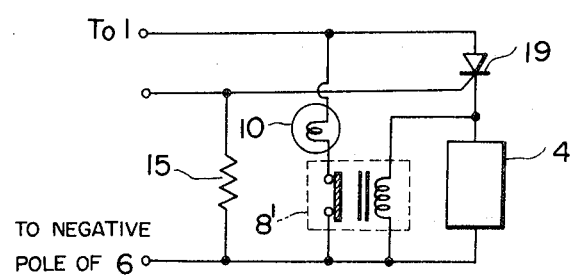
FIG. 3 is a circuit diagram showing a second preferred embodiment of a solid-state erroneous start preventing device for a battery-powered vehicle according to the present invention.

FIG. 2 and FIG. 3 show preferred embodiments of a solid-state erroneous start preventing device according to the present invention.

In FIG. 2, numeral 1 denotes the key switch connected to the power supply 6 such as a battery, numerals 2 and 3 denote a forward motion switch and a rearward motion switch, respectively, numeral 4 denotes a speed controller, e.g., an acceleration and deceleration circuit, numerals 5 and 5' denote relays connected to the switches 2 and 3, respectively, numeral 19 denotes a semiconductor triode switching device such as a reverse blocking triode thyristor whose anode terminal is connected to the power supply 6 via the key switch and whose cathode terminal is connected to the speed controller 4, numeral 9 denotes the drive indicating lamp, numeral 11 denotes two diodes whose anode terminals are connected to the switches 2 and 3, respectively, numeral 12 denotes a transistor whose base terminal is connected to the cathode terminals of the diodes 11 via a resistor 17, numeral 13 denotes a diode whose anode terminal is connected to the collector terminal of the transistor 12 and whose cathode terminal is connected to the gate terminal of the thyristor 19, numeral 14 denotes a capacitor connected to the cathode terminal of the diode 13 for triggering the thyristor 19 when charged via the diode 13 with the transistor 12 turned off, numeral 15 denotes a resistor connected to the gate terminal of the thyristor 19, and numeral 18 denotes a resistor connected to the base terminal of the transistor 12. Furthermore, a section 20 enclosed by a dotted line 20 denotes a first switching circuit and 30 denotes a second switching circuit.

As shown in FIG. 2, if the key switch 1 is closed when either of the switches 2 and 3 is turned on, so that either of the relays 5 and 5' is activated the capacitor 14 is not charged since a current flows via the key switch 1, either of the two operating switches 2 or 3 which is closed, one of the diodes 11, resistor 17 and the base-emitter of the transistor 12. Thus the transistor 12 is turned on by the closure of the key switch 1 dropping the potential of the anode of the diode 13 to nearly zero. Hence, the thyristor 19 is not turned on so that the power supply 6 cannot apply voltage to the controller 4. It is well known that if the controller 4 is not biased by the DC voltage from the battery 6, the vehicle cannot move even if the motor M is connected to the voltage supply $V_B$. Consequently, an erroneous starting of a battery-powered vehicle can be prevented.

However, if the key switch 1 is closed with both of the switches 2 and 3 open and with transistor 12 turned off, the transistor 12 remains off so that the capacitor 14 is charged via the resistor 16 and diode 13 and, in turn, the thyristor 19 conducts due to the charged potential of the capacitor 14. When the thyristor 19 conducts, the power supply 6 is connected electrically to the controller 4 so that the corresponding one of the relays 5 and 5' is turned on if either of switches 2 and 3 is turned on. Consequently, the battery-powered vehicle moves forward or rearward depending on which operating switch 2 or 3 is turned on.

In FIG. 3, showing the second preferred embodiment of the present invention, a relay 8', having a normally closed contact, and an erroneous operation indicating lamp 10 are provided in the device shown in FIG. 2 between the line connected to the key switch 1 and the line connected to the negative pole of the power supply 6.

Since the reverse blocking triode thyristor 19 does not conduct when the erroneous operation described above is performed, the relay 8' remains closed to light the erroneous operation indicating lamp 10.

After the reverse blocking triode thyristor 19 conducts, the relay opens to turn off the erroneous operation indicating lamp 10.

As described above, according to the present invention, the erroneous start preventing device for a battery-powered vehicle eliminates a neutral switch and related relay (in the second preferred embodiment of FIG. 3, only the neutral switch is eliminated) so that it becomes easy to house the entire device within a more limited space and the total cost is thus reduced. In addition, the neutral switch, which is not required in the device, can be used in the acceleration and deceleration controller for stopping an unfavorable oscillation.

It will be understood by those skilled in the art that the above and other similar modifications may be made in the preferred embodiment described above without departing from the spirit and scope of the present invention, which is to be defined by the appended claims.

What is claimed is:

1. A solid-state device for preventing erroneous starts in a battery-powered vehicle, which comprises:
    (a) a power supply key switch having on and off states and connected to a power supply having a negative pole and a positive pole;
    (b) an operating switch means having on and off states for operatively directing the battery-powered vehicle to move in a desired direction;
    (c) a solid-state first switching circuit means having on and off states, said solid-state first switching circuit means being located between said power supply key switch and a vehicle speed controller and operatively connected to said vehicle speed controller for maintaining an off state so as to disconnect the power supply from the vehicle speed controller when said power supply key switch is turned on while said operating switch means is on, for turning on and connecting the power supply to the vehicle speed controller when said power supply key switch is turned on while said operating switch is off, for remaining on after said operating switch means is turned on and off while said power supply key switch is on, and for turning off only when said power supply key switch is turned off; and
    (d) a second switching circuit means connected to said operating switch means and turned on when said operating switch means is turned on for connecting the power supply to a reversible motor, whereby the battery-powered vehicle starts with the reversible motor and vehicle speed controller operated when first said power supply key switch is turned on and thereafter said operating switch means is turned off.

2. A solid-state device for preventing erroneous starts as set forth in claim 1, wherein said first switching circuit means comprises:
(a) a reverse blocking triode thyrisor having an anode terminal connected to the positive pole of said power supply via said key switch and to said operating switch means and having a cathode terminal connected to the negative pole of said power supply via the vehicle speed controller;
(b) a trigger circuit means connected to a gate terminal of said reverse blocking triode thyristor for triggering said reverse blocking triode thyristor in response to a switching action of said operating switch means thereby to turn on said reverse blocking triode thyristor; and
(c) a transistor having a collector terminal connected to said power supply key switch via a resistor and to said trigger circuit means, an emitter terminal connected to the negative pole of the power supply, and a base terminal connected to said operating switch means via a resistor and a diode.

3. A solid-state device as set forth in claim 1, further comprising a first lamp means connected to said power supply key switch for indicating that the power supply is connected to the device for preventing erroneous starts.

4. A solid-state device for preventing erroneous starts as set forth in claim 1, wherein said operating switch means comprises a pair of connected switches, not turned on simultaneously, having a common terminal thereof connected to the positive pole of said power supply via the key switch, and two other terminals connected to said first and second switching circuit means and wherein said second switching circuit means comprises two relays having a pair of coils, one coil connected in series with one of the pair of connected switches and the other coil connected in series with the other of the pair of connected switches; and one contact of each of said relays being connected to the reversible motor;
whereby the battery-powered vehicle moves forward or rearward depending on which relay of said second switching circuit means is actuated.

5. A solid-state device for preventing erroneous starts as set forth in claim 2, further comprising a lamp means connected to the anode terminal of said reverse blocking triode thyristor for indicating an erroneous switching sequence, and a normally closed contact relay whose contact are connected in series with said lamp means and having a relay coil one terminal of which is connected to the cathode terminal of said reverse blocking triode thyristor and the other terminal of which is connected to the negative pole of the power supply,
whereby said lamp means is turned off when said reverse blocking triode thyristor is turned on.

6. A solid-state device for preventing erroneous starts as set forth in claim 5, wherein said trigger circuit means comprises a diode having an anode terminal connected to the key switch via said resistor and to the collector terminal of said transistor and a cathode terminal connected to the gate terminal of said reverse blocking triode thyristor, a capacitor having one terminal connected to the gate terminal of said reverse blocking triode thyristor and another terminal connected to the emitter terminal of said transistor, and a resistor connected across said capacitor.

7. A solid-state device for preventing erroneous starts as set forth in claim 2, wherein said trigger circuit means comprises a diode having an anode terminal connected to the collector terminal of said transistor and to said power supply key switch via said resistor and a cathode terminal connected to the gate terminal of said reverse blocking triode thyristor, a capacitor connected between the gate terminal of said reverse blocking triode thyristor and the emitter terminal of said transistor, and a resistor connected across said capacitor.

* * * * *